US011554505B2

(12) United States Patent
Anderson

(10) Patent No.: US 11,554,505 B2
(45) Date of Patent: Jan. 17, 2023

(54) SYSTEMS AND METHODS FOR PROVIDING, IN PROGRAMMABLE MOTION DEVICES, COMPLIANT END EFFECTORS WITH NOISE MITIGATION

(71) Applicant: Berkshire Grey Operating Company, Inc., Bedford, MA (US)

(72) Inventor: Bretton Anderson, Westford, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 110 days.

(21) Appl. No.: 16/985,295

(22) Filed: Aug. 5, 2020

(65) Prior Publication Data

US 2021/0039268 A1 Feb. 11, 2021

Related U.S. Application Data

(60) Provisional application No. 62/884,359, filed on Aug. 8, 2019.

(51) Int. Cl.
*B25J 15/06* (2006.01)
*B25J 9/14* (2006.01)

(52) U.S. Cl.
CPC ............ *B25J 15/0683* (2013.01); *B25J 9/14* (2013.01)

(58) Field of Classification Search
CPC . B25J 15/0616; B25J 15/0683; B66C 1/0231; B66C 1/0287; B66C 1/0293; B25B 11/005; B25B 11/007
USPC .................................................. 294/183, 189
See application file for complete search history.

(56) References Cited

U.S. PATENT DOCUMENTS

| | | | |
|---|---|---|---|
| 2,853,333 A | 9/1958 | Littell | |
| 3,005,652 A | 10/1961 | Helm | |
| 3,181,563 A | 5/1965 | Giffen | |
| 3,195,941 A | 7/1965 | Morey | |
| 3,656,794 A * | 4/1972 | McCord | B65B 35/18 |
| | | | D7/688 |
| 3,743,340 A | 7/1973 | Williamann | |
| 3,863,969 A * | 2/1975 | Weiss | B66C 1/0293 |
| | | | 294/189 |
| 4,389,064 A | 7/1983 | Laverriere | |
| 4,557,659 A | 12/1985 | Scaglia | |

(Continued)

FOREIGN PATENT DOCUMENTS

| | | |
|---|---|---|
| CN | 1390438 A | 1/2003 |
| CN | 1744970 A | 3/2006 |

(Continued)

OTHER PUBLICATIONS

International Search Report and Written Opinion issued by the International Searching Authority in related International Application No. PCT/US2020/044923 dated Nov. 18, 2020, 10 pages.

(Continued)

*Primary Examiner* — Dean J Kramer
(74) *Attorney, Agent, or Firm* — Gesmer Updegrove LLP

(57) ABSTRACT

A vacuum cup is disclosed for use in a programmable motion device. The vacuum cup includes an open inlet for coupling to a vacuum source, and a vacuum cup lip on a portion of the vacuum cup that generally surrounds the open inlet. The vacuum cup lip includes an inner surface that defines the open outlet through which a vacuum may be provided, and includes noise mitigation features on an outer surface of the vacuum cup lip.

27 Claims, 8 Drawing Sheets

(56) References Cited

U.S. PATENT DOCUMENTS

| | | | |
|---|---|---|---|
| 4,600,229 A * | 7/1986 | Oten | B65G 47/91 294/189 |
| 4,828,304 A | 5/1989 | No et al. | |
| 5,190,332 A * | 3/1993 | Nagai | B65G 47/91 271/90 |
| 5,207,465 A | 5/1993 | Rich | |
| 5,253,858 A | 10/1993 | Grieve | |
| 5,752,729 A | 5/1998 | Crozier et al. | |
| 5,856,487 A | 2/1999 | Gore et al. | |
| 5,865,487 A | 2/1999 | Gore et al. | |
| 5,890,553 A | 4/1999 | Bar-Cohen et al. | |
| 6,131,973 A | 10/2000 | Trudeau et al. | |
| 6,193,291 B1 * | 2/2001 | Morroney | B25B 11/007 294/189 |
| 6,213,528 B1 * | 4/2001 | Hufken | B65G 47/917 294/186 |
| 6,382,692 B1 | 5/2002 | Schmalz et al. | |
| 6,607,054 B1 * | 8/2003 | Lindfield | F16B 47/006 248/205.8 |
| 6,817,639 B2 | 11/2004 | Schmalz et al. | |
| 7,017,961 B1 | 3/2006 | Parnell et al. | |
| 7,618,074 B2 | 11/2009 | Zimmer | |
| 8,070,203 B2 | 12/2011 | Schaumberger | |
| 9,999,977 B2 | 6/2018 | Wagner et al. | |
| 10,118,300 B2 * | 11/2018 | Wagner | B25J 15/0616 |
| 10,343,284 B2 | 7/2019 | Wagner et al. | |
| 10,399,236 B2 | 9/2019 | Wagner et al. | |
| 10,576,641 B2 | 3/2020 | Wagner et al. | |
| 10,596,711 B2 | 3/2020 | Wagner et al. | |
| 10,618,177 B2 | 4/2020 | Wagner et al. | |
| 10,639,787 B2 | 5/2020 | Wagner et al. | |
| 10,668,630 B2 | 6/2020 | Robinson et al. | |
| 10,850,402 B2 | 12/2020 | Wagner et al. | |
| 10,857,682 B2 | 12/2020 | Wagner et al. | |
| 10,875,185 B2 | 12/2020 | Wagner et al. | |
| 10,913,159 B2 | 9/2021 | Wagner et al. | |
| 2001/0013434 A1 | 8/2001 | Hopkins | |
| 2001/0045755 A1 | 11/2001 | Schick et al. | |
| 2002/0011735 A1 | 1/2002 | Nagai et al. | |
| 2002/0185575 A1 | 12/2002 | Kalb | |
| 2003/0038491 A1 | 2/2003 | Schmalz et al. | |
| 2006/0242785 A1 | 11/2006 | Cawley et al. | |
| 2007/0006940 A1 | 1/2007 | Perlman et al. | |
| 2010/0150743 A1 * | 6/2010 | Dellach | B66C 1/0212 417/182 |
| 2011/0255948 A1 | 10/2011 | Malinowski | |
| 2012/0025053 A1 | 2/2012 | Tell | |
| 2013/0129464 A1 | 5/2013 | Regan et al. | |
| 2013/0147101 A1 | 6/2013 | Cho | |
| 2016/0221187 A1 | 8/2016 | Bradski et al. | |
| 2016/0258473 A1 | 9/2016 | Koop et al. | |
| 2016/0271805 A1 | 9/2016 | Kuolt et al. | |
| 2017/0050315 A1 | 2/2017 | Henry et al. | |
| 2017/0057091 A1 | 3/2017 | Wagner et al. | |
| 2017/0062263 A1 | 3/2017 | Kesil et al. | |
| 2017/0072572 A1 | 3/2017 | Wagner et al. | |
| 2017/0080571 A1 | 3/2017 | Wagner et al. | |
| 2017/0080579 A1 | 3/2017 | Wagner et al. | |
| 2017/0087718 A1 | 3/2017 | Wagner et al. | |
| 2017/0120455 A1 | 5/2017 | Wagner et al. | |
| 2017/0136632 A1 | 5/2017 | Wagner et al. | |
| 2017/0197316 A1 | 7/2017 | Wagner et al. | |
| 2017/0225330 A1 | 8/2017 | Wagner et al. | |
| 2018/0056333 A1 | 3/2018 | Hicham et al. | |
| 2018/0134501 A1 | 5/2018 | Ge et al. | |
| 2018/0148272 A1 | 5/2018 | Wagner et al. | |
| 2018/0222061 A1 | 8/2018 | Alber | |
| 2018/0333749 A1 | 11/2018 | Wagner et al. | |
| 2019/0001505 A1 | 1/2019 | Wagner et al. | |
| 2019/0039240 A1 | 2/2019 | Wagner et al. | |
| 2019/0061174 A1 * | 2/2019 | Robinson | B65H 29/32 |
| 2019/0071260 A1 | 3/2019 | Laverdiere | |
| 2019/0134827 A1 | 5/2019 | Wagner et al. | |
| 2019/0216644 A1 | 7/2019 | Hershoff et al. | |
| 2019/0217471 A1 | 7/2019 | Romano et al. | |
| 2020/0016746 A1 | 1/2020 | Yap et al. | |
| 2020/0017314 A1 | 1/2020 | Rose et al. | |
| 2020/0030994 A1 | 1/2020 | Wagner et al. | |
| 2020/0130935 A1 | 4/2020 | Wagner et al. | |
| 2020/0269416 A1 | 8/2020 | Toothaker et al. | |
| 2020/0338728 A1 | 10/2020 | Toothaker et al. | |
| 2021/0237285 A1 | 8/2021 | Anderson et al. | |
| 2021/0308874 A1 | 10/2021 | Gealy et al. | |
| 2021/0308875 A1 | 10/2021 | Gealy et al. | |
| 2022/0048717 A1 | 2/2022 | Sullivan et al. | |
| 2022/0118629 A1 | 4/2022 | Payton et al. | |

FOREIGN PATENT DOCUMENTS

| | | |
|---|---|---|
| CN | 101925959 A | 12/2010 |
| CN | 203680306 U | 7/2014 |
| CN | 105668255 A | 6/2016 |
| DE | 3324441 A1 | 10/1984 |
| DE | 3810989 A1 | 8/1989 |
| DE | 10121344 A1 | 11/2002 |
| DE | 102011115951 A1 | 4/2013 |
| EP | 2960024 A1 | 12/2015 |
| EP | 3520973 A1 | 8/2019 |
| FR | 2527968 A1 | 12/1983 |
| JP | 2010201536 A | 9/2010 |
| JP | 2018130810 A | 8/2018 |
| JP | 2020089936 A | 6/2020 |
| WO | 2014040843 A1 | 3/2014 |
| WO | 2014161549 A1 | 10/2014 |
| WO | 2015162390 A1 | 10/2015 |
| WO | 2017035466 A1 | 3/2017 |
| WO | 2017044632 A1 | 3/2017 |
| WO | 2017119982 A1 | 7/2017 |
| WO | 2019023729 A1 | 2/2019 |

OTHER PUBLICATIONS

Notification Concerning Transmittal of International Preliminary Report on Patentability and the International Preliminary Report on Patentability issued by the International Bureau of WIPO in related International Application No. PCT/US2020/044923 dated Feb. 17, 2022, 8 pages.

Communication pursuant to Rules 161(1) and 162 EPC issued by the European Patent Office in related European Patent Application No. 20760997.5 dated Mar. 16, 2022, 3 pages.

International Search Report and Written Opinion issued by the International Searching Authority in related International Application No. PCT/US2021/016582 dated Jun. 9, 2021, 10 pages.

Anver Corporation: Vacuum Tube Lifting Systems, Nov. 22, 2004 (http://www.jrgindustries.com/assets/anver.pdf).

Notification Concerning Transmittal of Copy of International Preliminary Report on Patentability and the International Preliminary Report on Patentability issued by the International Bureau of WIPO in related International Application No. PCT/US2021/016582 dated Aug. 18, 2022, 8 pages.

* cited by examiner

SYSTEMS AND METHODS FOR PROVIDING, IN PROGRAMMABLE MOTION DEVICES, COMPLIANT END EFFECTORS WITH NOISE MITIGATION

PRIORITY

The present application claims priority to U.S. Provisional Patent Application Ser. No. 62/884,359 filed Aug. 8, 2019, the disclosure of which is hereby incorporated by reference in its entirety.

BACKGROUND

The invention generally relates to programmable motion systems and relates in particular to end-effectors for programmable motion devices (e.g., robotic systems) for use in object processing such as object sortation or order fulfillment.

End-effectors for robotic systems may be employed, for example, in certain applications to select and grasp an object, and then move the acquired object very quickly to a new location. End-effectors should be designed to quickly and easily select and grasp an object from a jumble of dissimilar objects, and should be designed to securely grasp an object during movement. Certain end-effectors, when used on different objects of different physical sizes, weights and materials, may have limitations regarding how securely they may grasp an acquired object during rapid movement, particularly rapid acceleration and deceleration (both angular and linear).

Many end-effectors employ vacuum pressure for acquiring and securing objects for transport and/or subsequent operations by robotic systems that include articulated arms. Other techniques for acquiring and securing objects involve electrostatic attraction, magnetic attraction, needles for penetrating objects such as fabrics, fingers that squeeze an object, hooks that engage and lift a protruding feature of an object, and collets that expand in an opening of an object, among other techniques.

In applications where vacuum pressure is used to acquire and secure objects, an end-effector may include a vacuum cup having a compliant lip that contacts the object to be grasped. The compliant lip may be formed of a polymeric or elastomeric material that is flexible enough to allow it to adapt to variations in surface structures. The lip may facilitate creating a seal with a surface despite irregularities such as bumps and texture on the surface. The flexibility allows the vacuum cup to conform to the shape of objects or to wrap around corners of objects to create an adequate seal for acquiring and securing the object.

When a good seal is not created between a flexible vacuum cup and an object however, (due for example, to the nature of the product or because the vacuum cup is overhanging an edge of the object), the portion of the lip of the vacuum cup that is not well sealed may contribute to making noise, sometimes a substantial amount of noise, and the noise level may be above safe limits if human personnel are in close proximity to the programmable motion device. Other types of end-effectors, however, including vacuum cups with less flexible lips (in addition to those using electrostatic attraction, magnetic attraction, needles for penetrating objects such as fabrics, fingers that squeeze an object, hooks that engage and lift a protruding feature of an object, and collets that expand in an opening of an object), are less effective at acquiring and moving a wide variety of objects.

There remains a need therefore, for an end-effector system in a programmable motion system that may select and grasp any of a wide variety of objects, and then move the acquired objects very quickly to a new location while not producing an unacceptable level of noise.

SUMMARY

In accordance with an aspect, the invention provides a vacuum cup for use in a programmable motion device. The vacuum cup includes an open inlet for coupling to a vacuum source, and a vacuum cup lip on a portion of the vacuum cup that generally surrounds the open inlet. The vacuum cup lip includes an inner surface that defines the open outlet through which a vacuum may be provided, and includes noise mitigation features on an outer surface of the vacuum cup lip.

In accordance with another aspect, the invention provides a vacuum cup for use in a programmable motion device. The vacuum cup includes an open inlet for coupling to a vacuum source, a vacuum cup lip on a portion of the vacuum cup that is generally opposite the open inlet, and an open outlet through which a vacuum may be provided. The vacuum cup includes a plurality of protrusions on an outer surface of the vacuum cup lip.

In accordance with yet another aspect, the invention provides a method of providing a vacuum source in a programmable motion device. The method includes coupling the vacuum source to open inlet of a vacuum cup, said vacuum cup including noise mitigation features on an outer surface of the vacuum cup, and providing a vacuum cup open outlet through which the vacuum may be provided.

In accordance with a further aspect, the invention provides a system for providing automated processing of objects. The system includes a programmable motion device including an end-effector that is coupled to a vacuum source. The end-effector includes a vacuum cup that includes noise mitigation features on an outer surface of the vacuum cup.

BRIEF DESCRIPTION OF THE DRAWINGS

The following description may be further understood with reference to the accompanying drawings in which.

Figure 1:
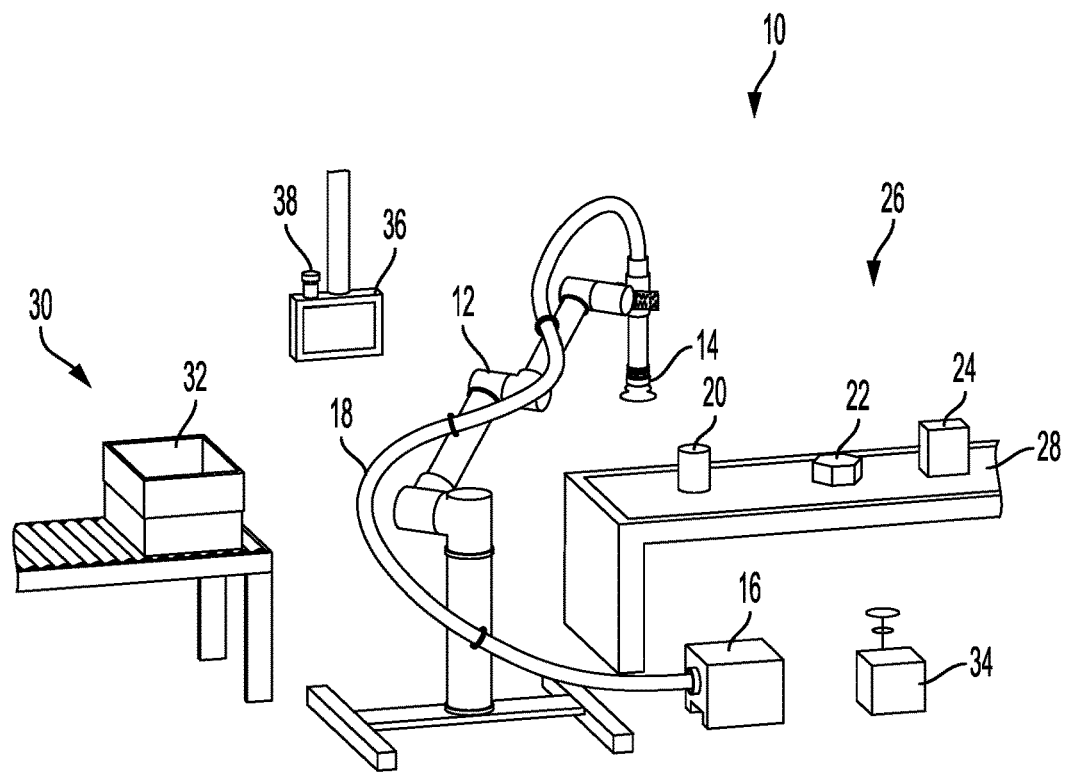
FIG. 1 shows an illustrative diagrammatic view of an automated object processing system in accordance with an aspect of the present invention.

The drawings are shown for illustrative purposes only.

DETAILED DESCRIPTION

In high airflow vacuum applications, a vacuum is provided that has an airflow of at least about 100 cubic feet per minute, and a vacuum pressure at the end effector of no more than about 65,000 Pascals below atmospheric (e.g., about 50,000 Pascals below atmospheric or 7.25 psi). Applicants have discovered that when such a high airflow vacuum is provided that does not create a good seal (again, due for example to the nature of the product or because the vacuum cup overhangs an edge of the object), the lip may vibrate from the high airflow creating a loud (sometimes whistling) noise.

In accordance with various aspects, the invention provides a vacuum cup for a programmable motion device that include integral noise mitigation features. In accordance with further specific aspects, the noise mitigation features may include any of protrusions, lands, rises, relief features, and/or bumps that extend from a non-object contacting side of the lip of a vacuum cup. Surprisingly, the use of such features reduces the noise generated by a compliant vacuum cup when used in a high airflow application.

In accordance with various aspects, the noise mitigation features increase the mass of the vacuum cup on the outer rim, but do not negatively decrease the flexibility of the material of the vacuum cup lip. Such noise mitigation features are believed to reduce the frequency at which the vacuum cup lip vibrates when subject to the high vacuum flowrate, while not adversely affecting the stiffness of the vacuum cup lip, which is important to providing the compliance (flexibility) needed to create a seal in a wide variety of applications.

The invention involves adding material to a top side of a lip of a molded vacuum cup, which may be presented as small protrusions or bumps (features) encircling the top side of the lip of the cup in accordance with various aspects. The distance between each of the features, as well as the circumference(es) and height(s) and/or length(s), width(s), and height(s) of the features may vary in accordance with various aspects, together with the material of the vacuum cup lip, the thickness of the lip of the cup and the size (diameter) of the circumference of the centers of the circle of features, as well as the angle (complex or linear) of the widening of the lip of the vacuum cup within bounds of various aspects of the invention that provide sufficient flexibility to engage a good seal on a variety of objects, yet also provide a sufficient quantity of sufficiently distributed outer mass features on the top side of a lip of a vacuum cup.

For example, a vacuum cup of an end effector may have an innermost diameter (vacuum passage) of about 0.5 inches to about 1.5 inches, while a lip of the vacuum cup may have an outer diameter of about 1.5 inches to about 4.5 inches. A high flow vacuum may be provided, e.g., by a blower, having a vacuum pressure at the end effector of no more than about 65,000 Pascals below atmospheric (e.g., about 50,000 Pascals below atmospheric or 7.25 psi).

FIG. 1 for example, shows a system 10 including a programmable motion device 12 having an end effector 14 in accordance with an aspect of the present invention. A vacuum source 16 is coupled to the end effector 14 via a hose 18, and the programmable motion device 12 is programmed to select objects 20, 22, 24 from an input area 26 (including for example a belted conveyor 28), and to provide selected objects to an output area 30 that includes, for example, one or more output boxes 32 under the control of one or more computer processing systems 34. Operation of the programmable motion device (e.g., robot) 12, including for example, current jobs and future intended movements or needs of the robot 12, may be displayed on a monitor 36, and an override stop switch 38 may also be provided for safety purposes.

Figure 2:
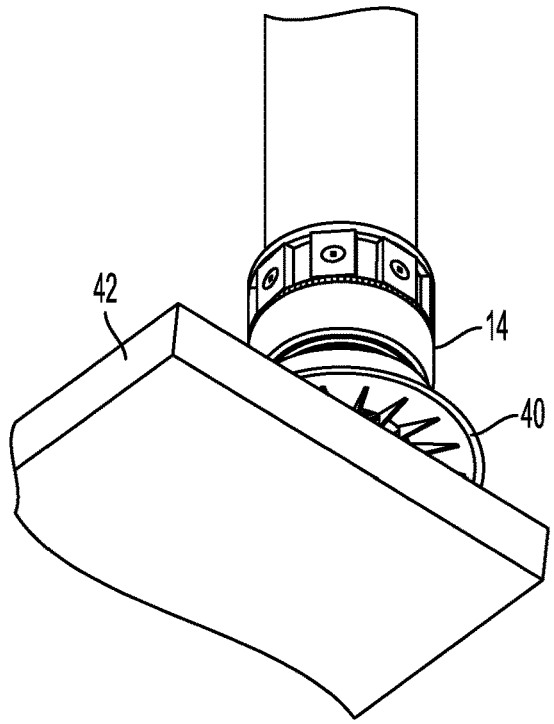
FIG. 2 shows an illustrative diagrammatic view of an underside of an end-effector in accordance with an aspect of the invention that is partially grasping an object.

FIG. 2 shows an underside of a vacuum cup 40 of the end effector 14, wherein the vacuum cup 40 is grasping an object 42 such that a seal is not formed against the object because the vacuum cup extends over an edge of the object. Using the high flow vacuum of embodiments of the present invention (e.g., about 50,000 Pascals below atmospheric), the object is grasped and maintained by the vacuum cup.

Figure 3A:
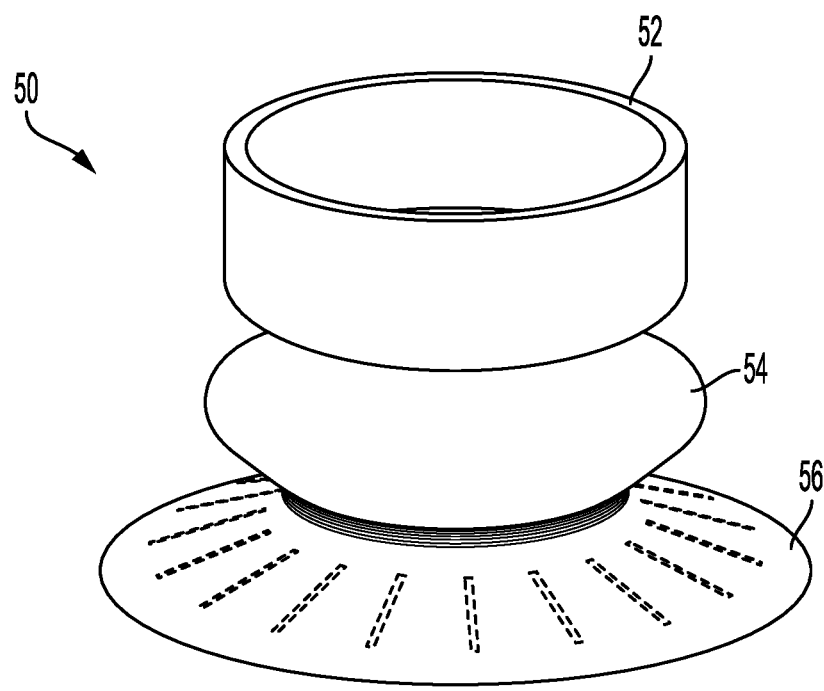
FIGS. 3A and 3B show illustrative diagrammatic views of a vacuum end-effector in accordance with the prior art from a side view (FIG. 3A) and from below (FIG. 3B)
Figure 3B:
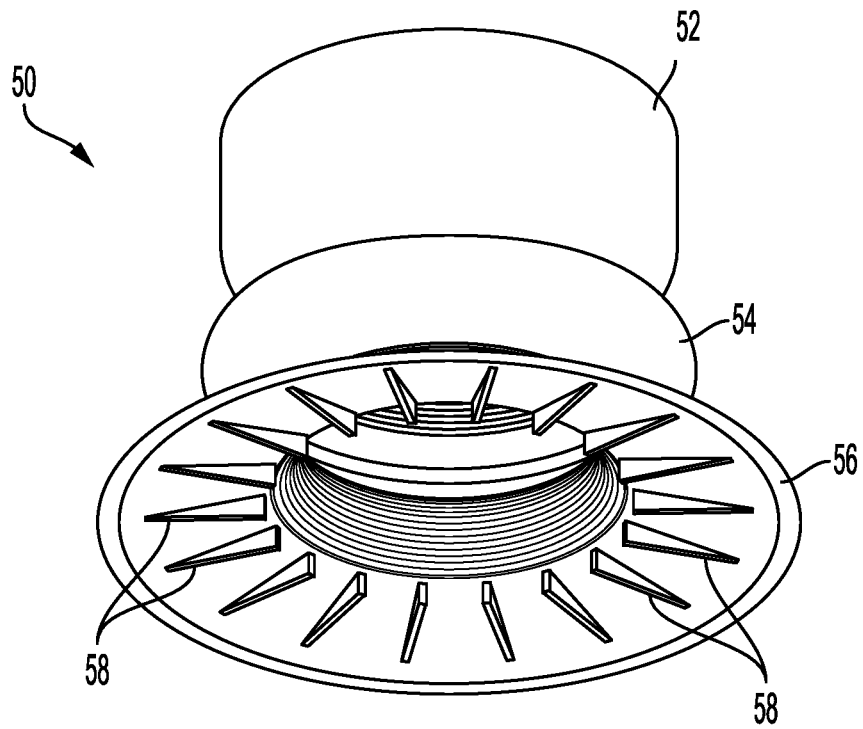

FIGS. 3A and 3B show a vacuum cup 50 in accordance with the prior art. The vacuum cup 50 includes an attachment portion 52 for attaching to an end effector section, a flexible bellows portion 54, and a flexible flanged portion 56 for creating a seal against objects. The inner surface of the flexible flanged portion 56 includes ribs 58 spaced radially inward of an outer lip 59 of the vacuum cup. The ribs 58 support the flanged portion (i.e., keep the flanged portion from collapsing onto an object), when under the force of a sealed vacuum against an object.

Figure 4A:
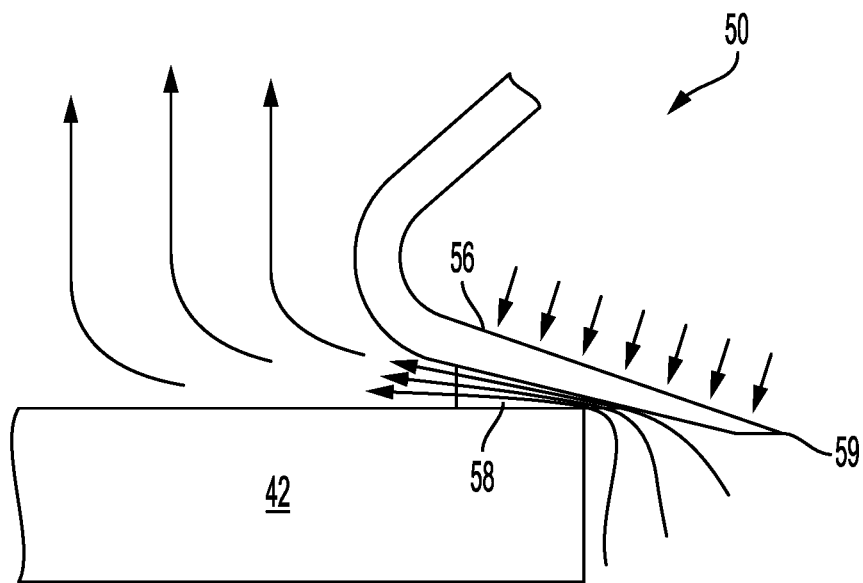
FIGS. 4A and 4B show an illustrative diagrammatic partial side views of a portion of a vacuum cup lip initially overhanging an object (FIG. 4A), and subsequently undergoing resonance causing noise (FIG. 4B)
Figure 4B:
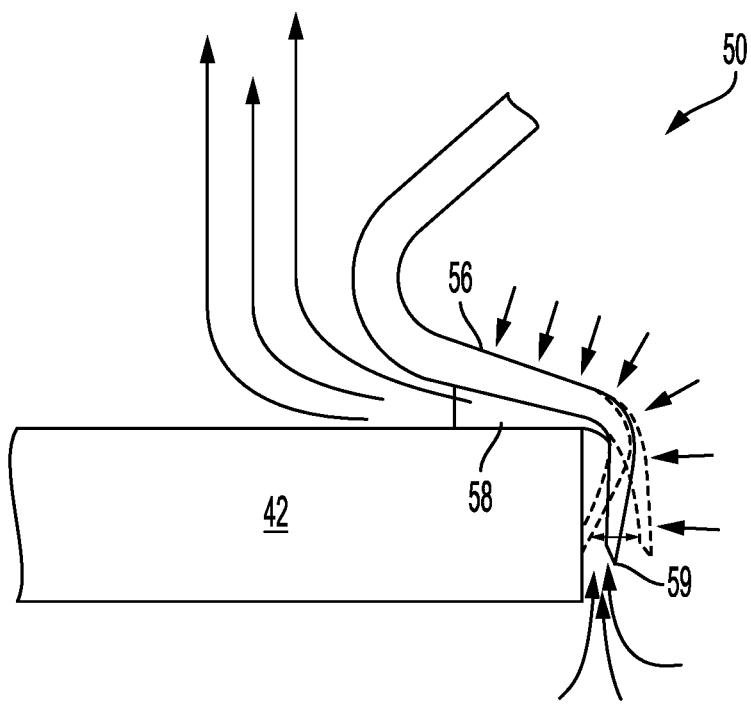

With reference to FIGS. 4A and 4B, when a seal is not created by the end vacuum cup 50 on an object 42 (e.g., because the object is grasped near an edge of the object), although the object may be able to be lifted by the force of the high flow vacuum passing between the ribs 58 (as shown in FIG. 4A), the overhanging portion of the vacuum cup lip 59 may be drawn toward the object 42 (as shown in FIG. 4B). Under select circumstances (e.g., the flexibility/stiffness of the flexible lip, the thickness of the flexible lip, the air flow rate, and the shape and volume of the open area that is not contacting the object), the vacuum cup lip may vibrate, causing substantial noise.

Figure 5:
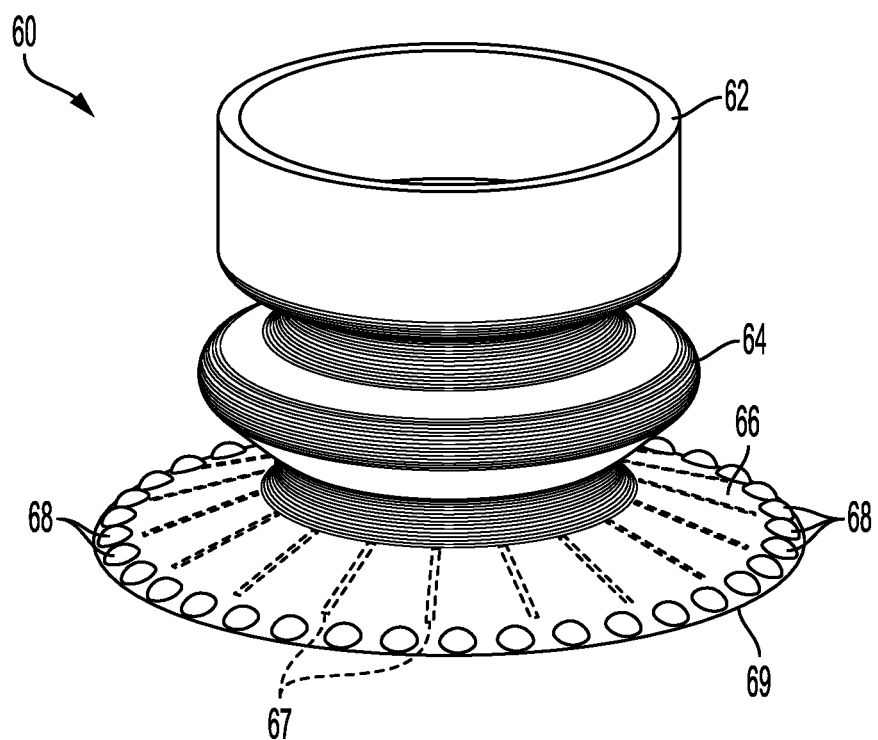
FIG. 5 shows an illustrative diagrammatic view of an end-effector for use in an automated object processing system in accordance with an aspect of the invention that includes pairs of noise mitigation features.

FIG. 5 shows a vacuum cup 60 in accordance with an aspect of the present invention. The vacuum cup 60 includes an attachment portion 62 for attaching to an end effector section, a flexible bellows portion 64, and a flexible flanged portion 66 for creating a seal against objects. The inner surface of the flexible flanged portion 66 includes ribs 67 spaced radially inward of an outer lip 69 of the vacuum cup. The vacuum cup 60 further includes noise mitigation features 68 in the form of partial spheres that are spaced from one another along a circumference of the vacuum cup lip. The noise mitigation features may be formed of, for example, silicone adhesive. The noise mitigation features may be evenly spaced with respect to the ribs 67 such that two features are provided (on the top) between ribs (on the bottom).

Figure 6:
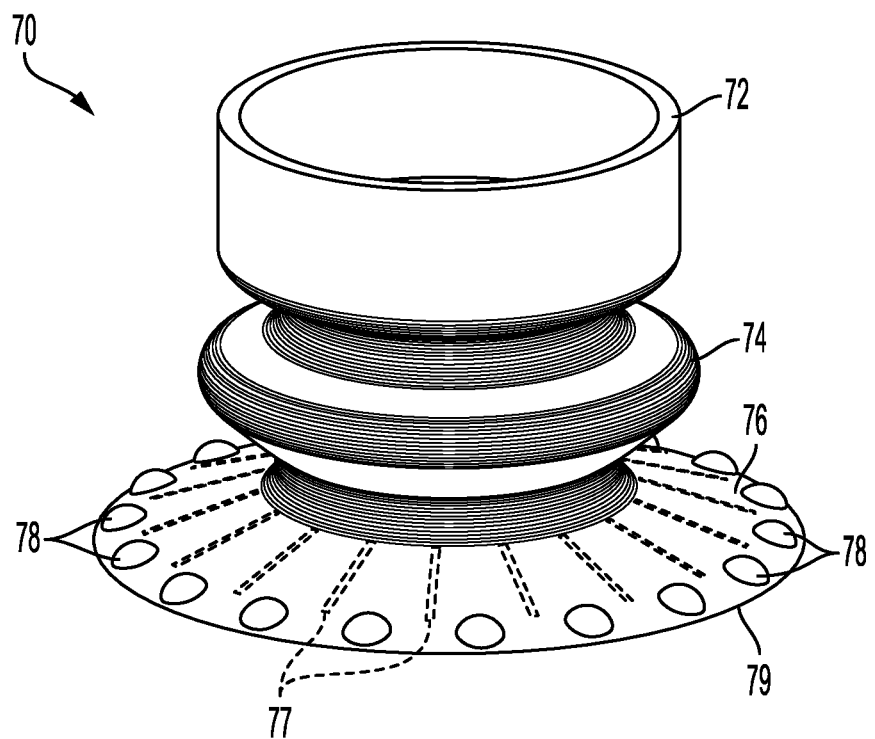
FIG. 6 shows an illustrative diagrammatic view of an end-effector for use in an automated object processing system in accordance with another aspect of the invention including larger noise mitigation features.

FIG. 6 shows a vacuum cup 70 in accordance with another aspect of the present invention that includes single, larger features associated with ribs. Similarly, the vacuum cup 70 includes an attachment portion 72 for attaching to an end effector section, a flexible bellows portion 74, and a flexible flanged portion 76 for creating a seal against objects. The inner surface of the flexible flanged portion 76 includes ribs 77 spaced radially inward of an outer lip 79 of the vacuum cup. The vacuum cup 70 further includes noise mitigation features 78 in the form of fewer larger spheres than the embodiment of FIG. 5 that are spaced from one another along a circumference of the vacuum cup lip. The noise mitigation features may be formed of, for example, silicone adhesive. The noise mitigation features may be evenly spaced with respect to the ribs 67 such that one feature is provided (on the top) between ribs (on the bottom).

Figure 7:
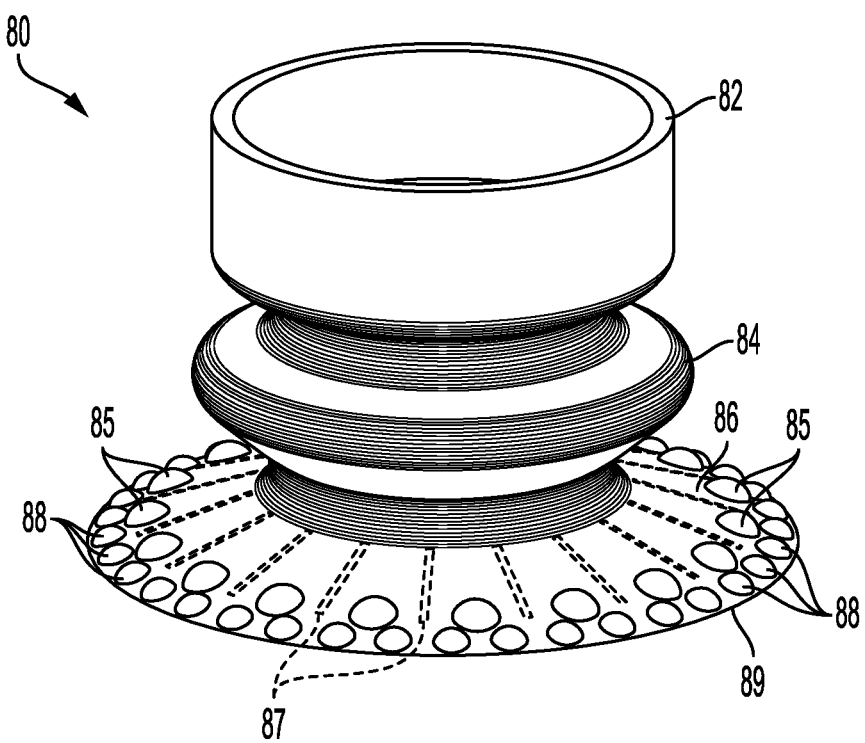
FIG. 7 shows an end-effector for use in an automated object processing system in accordance with another aspect of the invention including sets of three noise mitigation features.

FIG. 7 shows a vacuum cup 80 in accordance with a further aspect of the present invention that incudes differently sized features. The vacuum cup 80 includes an attachment portion 82 for attaching to an end effector section, a flexible bellows portion 84, and a flexible flanged portion 86 for creating a seal against objects. The inner surface of the flexible flanged portion 86 includes ribs 87 spaced radially inward of an outer lip 89 of the vacuum cup. The vacuum cup 80 further includes noise mitigation features 85, 88 in the form of spheres that are spaced from one another along a circumference of the vacuum cup lip. The noise mitigation features may be formed of, for example, silicone adhesive. The noise mitigation features may be evenly spaced with respect to the ribs 87 such that three features of two different sizes are provided (on the top) between ribs (on the bottom).

Figure 8:
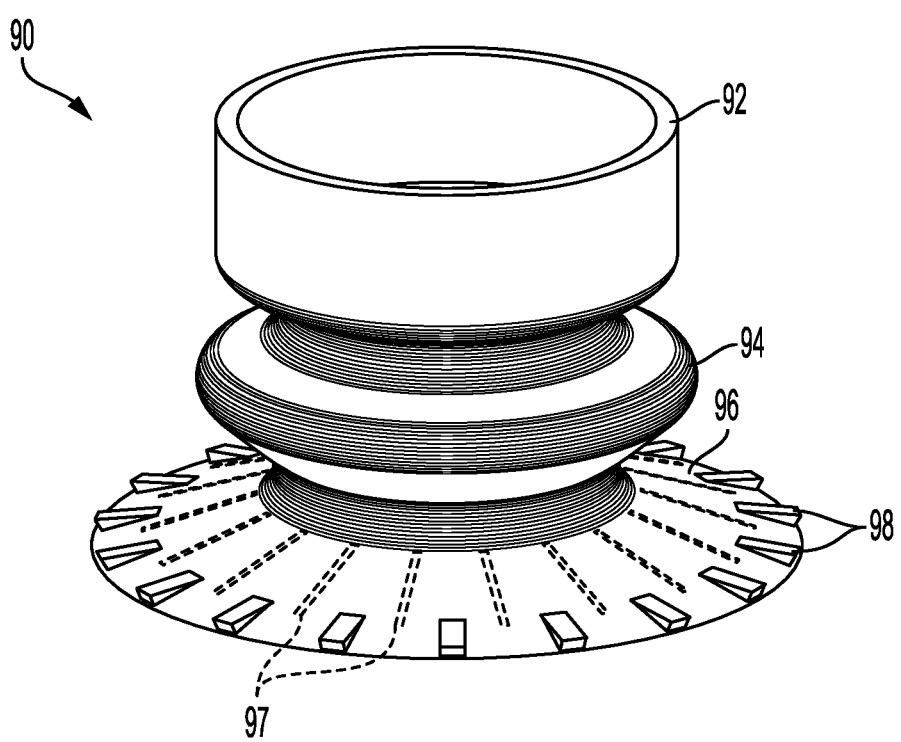
FIG. 8 shows an end-effector for use in an automated object processing system in accordance with an aspect of the invention including wedge-shaped noise mitigation features.

FIG. 8 shows a vacuum cup 90 in accordance with another aspect of the present invention that includes wedge-shaped features. Similarly, the vacuum cup 90 includes an attachment portion 92 for attaching to an end effector section, a flexible bellows portion 94, and a flexible flanged portion 96 for creating a seal against objects. The inner surface of the flexible flanged portion 96 includes ribs 97 spaced radially inward of an outer lip 99 of the vacuum cup. The vacuum cup 90 further includes noise mitigation features 98 in the form of wedges that are spaced from one another along a circumference of the vacuum cup lip. The noise mitigation features may be formed of, for example, silicone adhesive. The noise mitigation features may be evenly spaced with respect to the ribs 97 such that one feature is provided (on the top) between ribs (on the bottom).

Figure 9A:
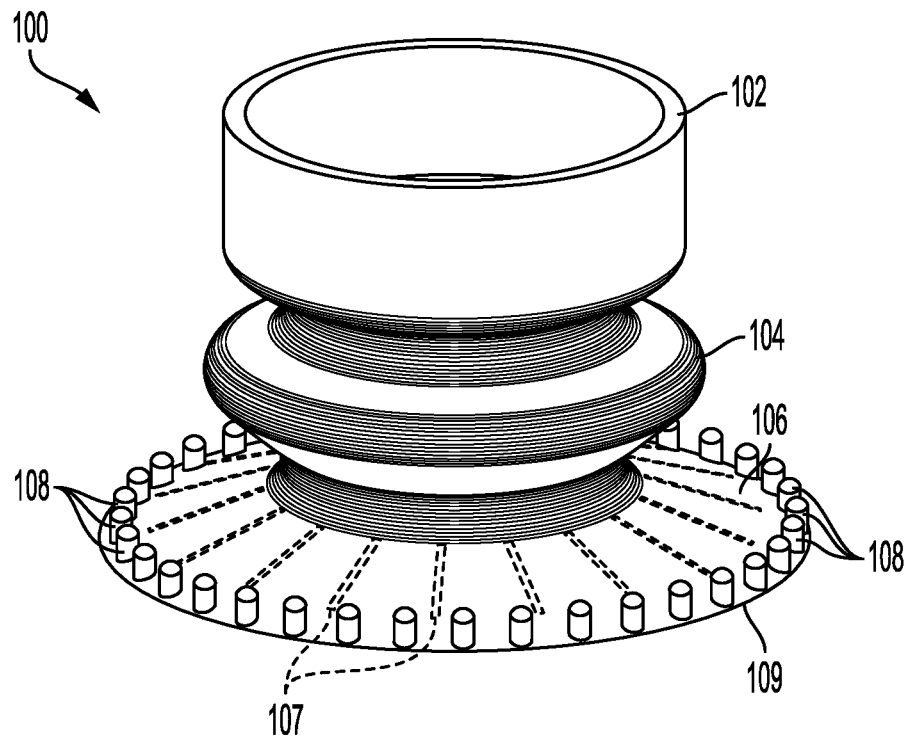
FIGS. 9A and 9B show an end-effector for use in an automated object processing system in accordance with an aspect of the invention including cylindrical-shaped noise mitigation features from above (FIG. 9A) and from below (FIG. 9B)
Figure 9B:
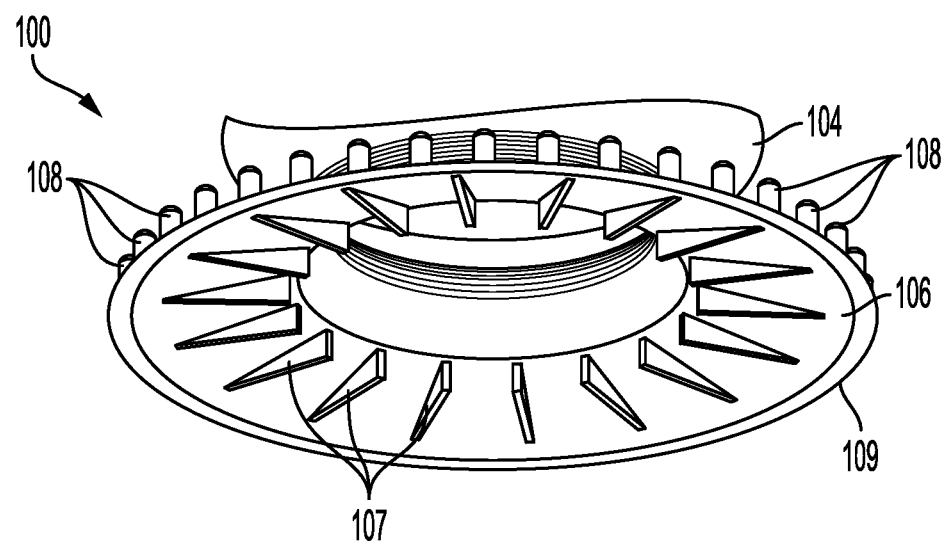

FIGS. 9A and 9B show a vacuum cup 100 in accordance with a further aspect of the present invention that includes cylindrically-shaped features. The vacuum cup 100 includes an attachment portion 102 for attaching to an end effector section, a flexible bellows portion 104, and a flexible flanged portion 106 for creating a seal against objects. The inner surface of the flexible flanged portion 106 includes ribs 107 spaced radially inward of an outer lip 109 of the vacuum cup. The vacuum cup 100 further includes noise mitigation features 108 in the form of cylinders that are spaced from one another along a circumference of the vacuum cup lip. The noise mitigation features may be formed of, for example, silicone adhesive. The noise mitigation features may be evenly spaced with respect to the ribs 107 such that two features are provided (on the top side) between ribs (on the bottom side).

Figure 10:
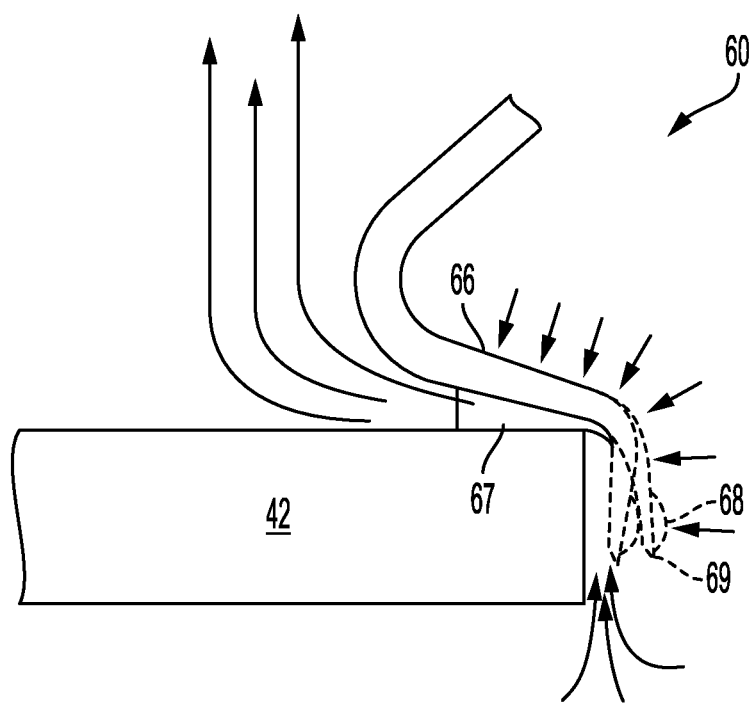
FIG. 10 shows an illustrative diagrammatic partial side view of the end-effector of FIG. 5.
Figure 11:
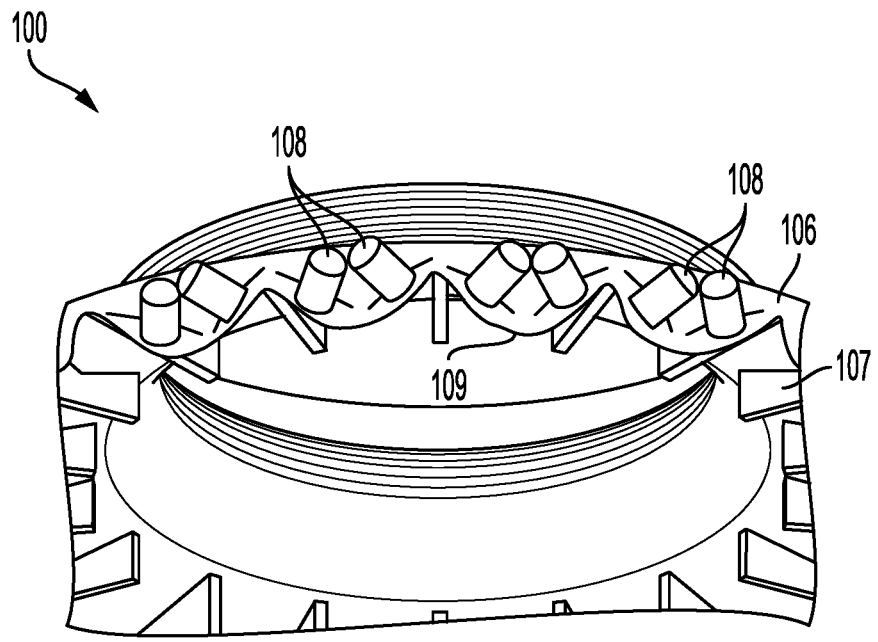
FIG. 11 shows an illustrative diagrammatic underside view of the end-effector of FIG. 9B while undergoing resonance.

With further reference to FIG. 10, in accordance with the above aspects of the present invention, when a seal is not made between a vacuum cup (e.g., 60) and an object 42, the noise mitigation features (e.g., 68) near the vacuum cup lip (e.g., 69) dampen the vibration of the vacuum cup lip, significantly reducing noise. Each of the noise mitigation features also discussed above (e.g., 68, 78, 85, 88, 98) may function similarly to reduce noise. Further, certain types of noise mitigation features (such as those discussed above with respect to FIGS. 9A and 9B), may contact each other as shown in FIG. 11 when the lip moves inward due to a high vacuum flow, further contributing to noise mitigation.

The noise mitigation features may, for example, range from about 0.008 cubic centimeters to about 1.75 cubic centimeters, and may preferably each be less than about 1 cubic centimeter in volume in certain embodiments. The noise mitigation features may also be formed of any of a silicone based adhesive, epoxy-based adhesive, or other polymeric material.

Figure 12:
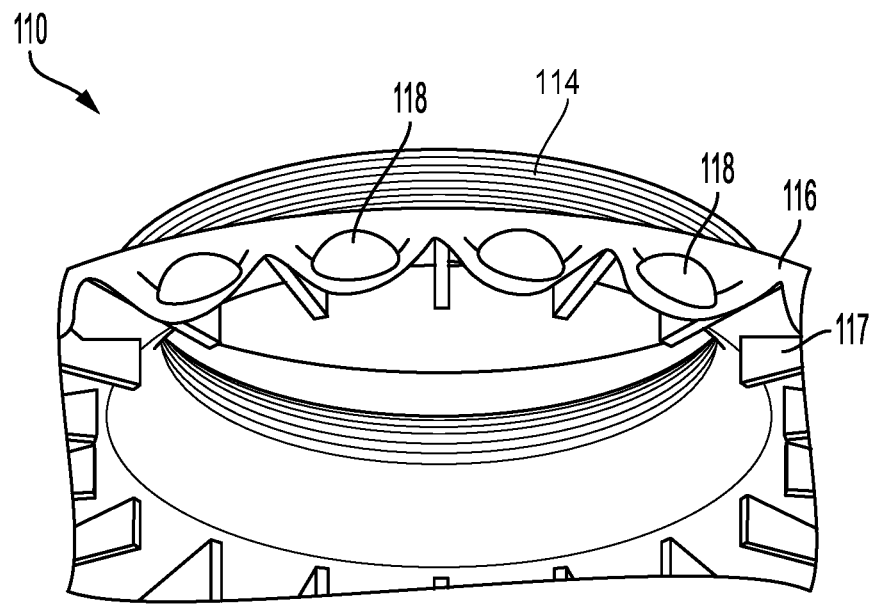
FIG. 12 shows an illustrative diagrammatic underside view of an end-effector in accordance with an aspect of the present invention that includes large semi-spherical protrusions as noise mitigation features.

FIG. 12 shows vacuum cup similar to that of FIG. 6 with larger noise mitigation features. In particular, FIG. 12 shows a vacuum cup 110 in accordance with another aspect of the present invention that includes larger partial spherically-shaped features. Similarly, the vacuum cup 110 includes an attachment portion for attaching to an end effector section, a flexible bellows portion 114, and a flexible flanged portion 116 for creating a seal against objects. The inner surface of the flexible flanged portion 116 includes ribs 117 spaced radially inward of an outer lip of the vacuum cup. The vacuum cup 110 further includes larger noise mitigation features 118 in the form of large spheres that are spaced from one another along a circumference of the vacuum cup lip. The noise mitigation features may be formed of, for example, silicone adhesive. The noise mitigation features may be evenly spaced with respect to the ribs 117 such that one feature is provided (on the top) between ribs (on the bottom).

In accordance with various embodiments therefore, the invention provides a system for providing automated processing of objects, where the system includes a programmable motion device including an end effector that is coupled to a vacuum source, with the end effector including a vacuum cup that includes noise mitigation features on an outer surface thereof.

Those skilled in the art will appreciate that numerous modifications and variations may be made to the above disclosed embodiments without departing from the spirit and scope of the present invention.

What is claimed is:

1. A vacuum cup for use in a programmable motion device, said vacuum cup comprising an open inlet for coupling to a vacuum source, and a vacuum cup lip on a portion of the vacuum cup that generally surrounds an open outlet, said vacuum cup lip including an inner surface that defines the open outlet through which a vacuum is provided, and including noise mitigation features on an outer surface of the vacuum cup lip, and
   wherein said noise mitigation features include protrusions from the vacuum cup lip on the outer surface of the vacuum cup lip and said protrusions are positioned alternate internal ribs on an inner surface of the vacuum cup lip.

2. The vacuum cup as claimed in claim 1, wherein vacuum cup lip is formed of a flexible polymeric material.

3. The vacuum cup as claimed in claim 1, wherein said noise mitigation features are formed of a polymeric material.

4. The vacuum cup as claimed in claim 1, wherein said noise mitigation features encircle the vacuum cup lip in a discontinuous manner.

5. The vacuum cup as claimed in claim 1, wherein said vacuum cup includes a flexible bellows portion.

6. The vacuum cup as claimed in claim 1, wherein said vacuum cup is generally conically shaped.

7. A vacuum cup for use in a programmable motion device, said vacuum cup comprising an open inlet for coupling to a vacuum source, a vacuum cup lip on a portion of the vacuum cup that is generally opposite the open inlet, and a vacuum cup open outlet through which a vacuum is provided, said vacuum cup including a plurality of protrusions on an outer surface of the vacuum cup lip, and
wherein said plurality of protrusions include at least partially generally spherical protrusions and said plurality of protrusions are positioned alternate internal ribs on an inner surface of the vacuum cup lip.

8. The vacuum cup as claimed in claim 7, wherein vacuum cup is formed of a flexible polymeric material.

9. The vacuum cup as claimed in claim 7, wherein said plurality of protrusions are formed of a polymeric material.

10. The vacuum cup as claimed in claim 7, wherein vacuum cup is formed of a flexible elastomeric material.

11. The vacuum cup as claimed in claim 7, wherein said plurality of protrusions encircle the vacuum cup open outlet in a discontinuous manner.

12. The vacuum cup as claimed in claim 7, wherein vacuum cup includes a flexible bellows portion.

13. The vacuum cup as claimed in claim 7, wherein said vacuum cup is generally conically shaped.

14. The vacuum cup as claimed in claim 7, wherein the plurality of protrusions provide that the vacuum cup lip includes alternating areas of relatively thin and relatively thicker lip thicknesses.

15. A method of providing a vacuum source in a programmable motion device, said method comprising:
coupling the vacuum source to an open inlet of a vacuum cup, said vacuum cup including noise mitigation features on an outer surface of the vacuum cup, wherein said noise mitigation features include protrusions from the vacuum cup on the outer surface of the vacuum cup and said protrusions are positioned alternate internal ribs on an inner surface of the vacuum cup; and
providing a vacuum cup open outlet through which a vacuum is provided.

16. The method as claimed in claim 15, wherein said noise mitigation features are formed of a polymeric material.

17. The method as claimed in claim 15, wherein said noise mitigation features are formed of an elastomeric material.

18. The method as claimed in claim 15, wherein said noise mitigation features encircle the vacuum cup open outlet in a discontinuous manner.

19. The method as claimed in claim 15, wherein said vacuum cup includes a flexible bellows portion.

20. The method as claimed in claim 15, wherein said noise mitigation features alter a resonance of the open outlet of the vacuum cup.

21. The method as claimed in claim 15, wherein the method further includes damping a resonance of a lip of the vacuum cup while the vacuum is provided through the open outlet.

22. The method as claimed in claim 21, wherein the vacuum has a vacuum pressure of no more than about 50,000 Pascals below atmospheric.

23. A system for providing automated processing of objects, said system comprising a programmable motion device including an end effector that is coupled to a vacuum source, said end effector including a vacuum cup that includes noise mitigation features on an outer surface of the vacuum cup, and
wherein said noise mitigation features include protrusions from a vacuum cup lip on the outer surface of the vacuum cup and said protrusions are positioned alternate internal ribs on an inner surface of the vacuum cup.

24. The system as claimed in claim 23, wherein said noise mitigation features encircle a vacuum cup lip in a discontinuous manner.

25. The system as claimed in claim 23, wherein said vacuum cup includes a flexible bellows portion.

26. The system as claimed in claim 23, wherein the vacuum source provides a maximum air flow rate at the end effector of at least about 100 cubic feet per minute.

27. The system as claimed in claim 23, wherein the vacuum source provides a vacuum pressure at the end effector of no more than about 50,000 Pascals below atmospheric.

* * * * *